US010764756B1

(12) United States Patent
Noonan

(10) Patent No.: US 10,764,756 B1
(45) Date of Patent: Sep. 1, 2020

(54) WIRELESS COMMUNICATION DEVICE MANAGEMENT

(71) Applicant: Joseph S. Noonan, Scituate, MA (US)

(72) Inventor: Joseph S. Noonan, Scituate, MA (US)

( * ) Notice: Subject to any disclaimer, the term of this patent is extended or adjusted under 35 U.S.C. 154(b) by 0 days.

(21) Appl. No.: 16/000,774

(22) Filed: Jun. 5, 2018

Related U.S. Application Data

(60) Provisional application No. 62/515,466, filed on Jun. 5, 2017.

(51) Int. Cl.
*H04M 1/66* (2006.01)
*H04W 12/08* (2009.01)
*H04W 48/04* (2009.01)
*H04W 48/14* (2009.01)
*H04W 64/00* (2009.01)
*H04W 8/00* (2009.01)
*H04W 4/021* (2018.01)
*H04W 52/38* (2009.01)

(52) U.S. Cl.
CPC ........... *H04W 12/08* (2013.01); *H04W 4/021* (2013.01); *H04W 8/005* (2013.01); *H04W 48/04* (2013.01); *H04W 48/14* (2013.01); *H04W 64/006* (2013.01); *H04W 52/38* (2013.01)

(58) Field of Classification Search
CPC ..... H04W 12/08; H04W 4/021; H04W 8/005; H04W 64/006; H04W 48/14; H04W 48/04; H04W 52/38; H04W 4/029; H04W 12/06; H04L 63/0861; G06F 21/31; G06F 21/32; G06F 21/36; G06Q 20/40145
See application file for complete search history.

(56) References Cited

U.S. PATENT DOCUMENTS

| | | | | |
|---|---|---|---|---|
| 2007/0241861 | A1* | 10/2007 | Venkatanna | G06F 21/32 340/5.52 |
| 2014/0018059 | A1* | 1/2014 | Noonan | H04W 48/04 455/419 |
| 2014/0024345 | A1* | 1/2014 | Mahaffey | G06F 21/30 455/411 |
| 2014/0194084 | A1* | 7/2014 | Noonan | H04W 4/029 455/404.1 |

* cited by examiner

*Primary Examiner* — Khoi H Tran
*Assistant Examiner* — B M M Hannan
(74) *Attorney, Agent, or Firm* — Office of Carl Giordano, PC

(57) ABSTRACT

A system, for managing wireless devices within a restricted area is disclosed, wherein the system constructs models, containing attributes/characteristics and at least prior history data information associated with wireless devices, wherein the information is used to determine whether the wireless devices are allowed to operate within the area by the device responding to a plurality of inquiries that require the device and/or the user to provide information which is compared to the modeled data.

26 Claims, 7 Drawing Sheets

WIRELESS COMMUNICATION DEVICE MANAGEMENT

CLAIM OF PRIORITY

This Application claims the priority to, and the benefit of the earlier filing date of provisional application Ser. No. 62/515,466, filed on Jun. 5, 2017, the content of which is incorporated by reference, herein.

FIELD OF THE INVENTION

The invention relates to the field of wireless communication devices and the management thereof.

BACKGROUND OF THE INVENTION

Wireless communication device, such as cell phones, have taken over much of the communications between people, that conventional landline services provided by telephone companies (e.g., AT&T, Verizon) are increasingly being replaced. One method of replacing conventional landline service has been the incorporation of Voice over IP (VoIP), wherein two-way communications is conducted over the Internet.

Cell phones, which were originally designed for voice communications between two people, have expanded their use to be connected to other cell phones, landline services and VoIP services, to provide not only voice transmission but also digital (data) transmission (e.g., SMS, texting, etc.), and access to the internet (i.e., web browsing). Cell phones (or similar wireless devices (e.g., iPad)) have incorporated camera systems that allow for the taking of photographs and/or video and the subsequent transmission of the photographs/videos through the Internet (e.g., WI-FI access) or cellular networks.

While communication devices provide ample opportunity for persons to access the entire world, there are situations in which access to the features of the wireless device are to be limited. For example, in a secure area, such as a correction facility, the management of the area may require users within the area to be denied one or more access features.

Management in many of these facilities is faced with several problems with the increased use of cell phones (or other similar devices) and the technology associated with the cell phones or other similar devices).

Furthermore, current correction facility phone usage is controlled through a land-line system that requires maintenance of the existing land line network. As land line usage is fading from usage, the land line networks are not being upgraded.

Since, inmates, within a correction facility, are legally denied access to the features of the wireless devices, smuggling of cell phones and other similar transmission capable devices, and the illegal use of these devices within the facility, is becoming an ever-increasing problem for the management of the facility. However, as the landline networks age, facility management may be required to allow a certain amount of controlled cell phone usage from those persons who are not generally authorized to operate a cell phone within the secured area.

However, as more cell phones are allowed to be used within the secured area, their random usage creates situations where multiple phones, operating on similar frequencies (or channels) may cause interference that prevents the usage of an appropriate signal. In this case, the interference may cause the determination of an incorrect location, since the characteristics of the interfering signal skew the location determination.

Since an incorrect location determination may result in authorized communications from being prohibited or unauthorized communication from being allowed, it is important to provide for an accurate location determination in supporting the management of wireless transmission devices within a secured area.

Hence, there is a need in the industry for a system and method for management of cell phones or other types of communication devices within a secured area.

SUMMARY OF THE INVENTION

It is therefore an object of the present invention to provide a system for managing cell phones (or other similar wireless transmission devices) within a secured area by modelling of each of a plurality of cell phones (or other types of wireless devices, e.g., transmission capable wrist bands or similar body worn type devices) within a secured area, wherein the modelling is determined by identifying a response provided by the cell phone (or wireless device) to a series of inquiries (or questions) posed to the cell phone or other types of wireless devices. A response that is consistent for at least one same inquiry associated with the device (i.e., cell phone or other similar wireless transmission device) is then utilized in formulating one or more further interrogations based on the model of the device (e.g., cell phone). In addition, in determining a location of the cell phone or device, the model comprises determining a further consistent response from which a location of the device may be determined. In accordance with the principles of the invention, a device location may be determined based on a time of arrival, for example, of both the first and second consistent response to one or more inquiries.

In accordance with the principles of the invention, each device (e.g., cell phone) within an area is modelled to include an identification number (e.g., phone number), a consistent response message and at least one second response message, that occurs after the first response message. The at least one second response message, occurring a time after the first response message, determines that time in which the second response is to be received. Thus, in predicting the time of a second response, interference from signals of other devices may be avoided. The limited time of the executed time to retain a receive window in the receive mode, results in the use of signal information (e.g., time and/or amplitude) that is associated with a same signal.

In accordance with the principles of the invention, the information associated with determination of a location of the device is based on the time of arrival of the information received during the opened receive window.

DESCRIPTION OF THE DRAWINGS

For a better understanding of exemplary embodiments and to show how the same may be carried into effect, reference is made to the accompanying drawings. It is stressed that the illustrative embodiments shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

It is noted that the drawings of the invention are not to scale. The drawings are intended to depict only typical aspects of the invention, and therefore should not be considered as limiting the scope of the invention.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

DESCRIPTION

Figure 1:
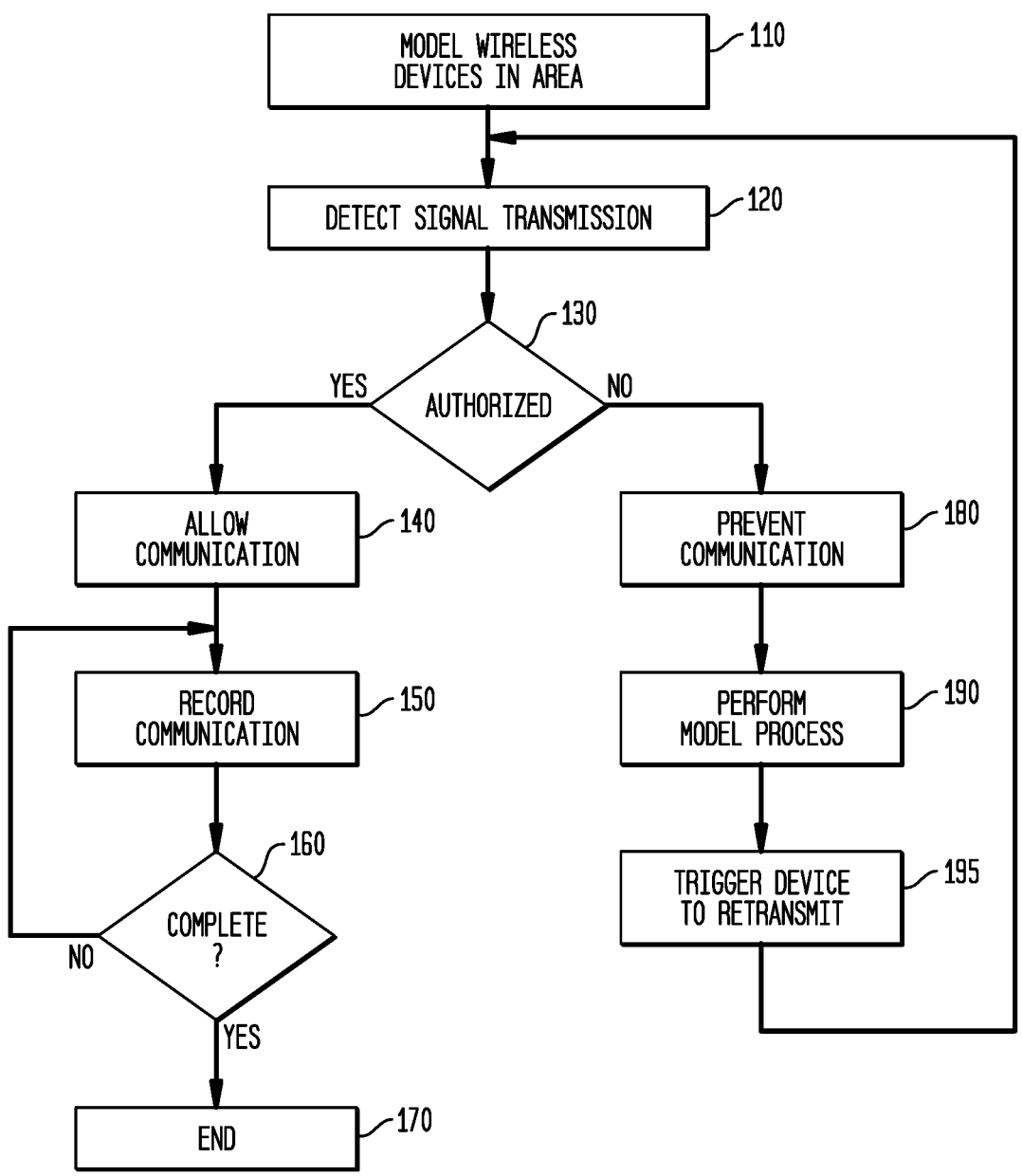
FIG. 1 illustrates an exemplary processing in accordance with the principles of the invention.

FIG. 1 illustrates an overview processing of a management system in accordance with the principles of the invention.

In this exemplary processing a modelling of the wireless devices may be performed. The modelling comprises, in part, determining a response transmission to an inquiry to which the device provides a response. The modelling further determines a time at which a second response, or next transmission, after the first response occurs. In one aspect of the invention, the modelling may further determine whether the first response is consistent with an expected response or consistent with a prior response.

Similarly, the modelling may determine whether the second response is consistent with an expected response or consistent with a prior response or received within an expected time from a preceding first response. The first and second responses may then be stored with an identification of the device and an indication of the authorized use of the device. For example, the authorized use of the device may be limited to one or more attributes, (e.g., user associated with the device, a time and/or place of allowed usage of the device, an amount of money in an account associated with a user of the device, a valid password, a valid biometric feature (e.g., a fingerprint, a rental scan, a facial recognition scan, etc.).

In one aspect of the invention, information regarding devices within the area may be provided to the management system and incorporated into the model associated with a wireless device. This information may include information such as identification of devices, a status of devices (e.g., standby (i.e., on and not transmitting) and active (i.e., on and transmitting)), encryption keys associated with the device, communication protocols (e.g., 2G, 3G, 4G, 5G) generally used by the device, the type of communication protocol (e.g., TDMA, GSM), etc.

Information regarding a location of wireless devices may similarly be provided to the management system or may be determined by the management system. For example, a device that is not within a coverage area associated with the management system. For example, a device that is outside of a base station coverage area which encompasses a restricted area associated with the management station may be indicated as not being located within the restricted area. The location of the device may be determined through one or more of a cell identification, a location of an associated user, etc. The management system may dynamically determine a location of a device based on, for example, signal amplitude detection on one or more receiving systems.

As would be appreciated, the information provided to the management system may include information regarding all devices within the coverage area of a commercial or third party (e.g., AT&T) base station covering the restricted area managed by the management system. The management system may then cull from the received data a list of potential devices estimated to be within the restricted area.

Information regarding the wireless devices may further be provided by external sources that further identify those devices within the area. For example, information regarding wireless devices entering an area may be provided to the management system by sensors positioned throughout the facility that monitor electronic transmission within the facility. Similarly, a registration process may provide information to the management system regarding wireless devices, wherein a user may register their presence within the area. The registration information may include information regarding one or more devices associated with a user, and location of the user. The modelling may further include one or more telephone contact numbers (or other similar identification information) to which the wireless device may communicate. The contact information may further include information regarding the ability to receive a communication from a contact number or to transmit a communication to a contact number. The communication may be one of a voice communication, a text communication (e.g., SMS messages) or other similar communications.

With knowledge of devices within or expected to be within the restricted area, each of the devices within or expected to be within the restricted area may be subjected to inquiries to enhance the model construction.

For example, each of the devices may be polled to provide their identification and/or location information. Location information may be further subjected to dynamic determination based on triangulation using either amplitude or time of arrival of signals transmitted by the wireless device(s) and detected by receiving systems of the management system. As would be appreciated, the polling of the devices suspected to be within the restricted area may be performed in a sequential order sorted by the confidence of the device being within the restricted area. That is, in one aspect of the invention, the devices may be sorted based on a likelihood of the device being within the area. The confidence factor may be determined based on the accuracy of the location information provided by the base station, for example. Alternatively, the polling of devices may be performed in a sequential order based on a distance of the device to the management system. That is, a distance between the provided location and the location of the management system may be determined and the device may be polled from a closest distance to a furthest distance order. Alternatively, the devices may be polled from a furthest distance to a closest distance order. Alternatively, the devices may be polled based on the expected communication protocol. That is, in a descending protocol (e.g., 5G, 4G, 3G, etc.) order.

The model may further confirm or validate those devices that are expected to be within the area. The confirmation or validation may comprise one or more of a time of day, a user, a location of the user, etc. For example, an authorized user of a device identified as being within the area may identify the device as being allowed to operate within the area. However, if the authorized user of a device is not expected to be within the area or the authorized user is not within the area, it may identify the device as being suspect or not allowed.

An identification of suspect may require further inquiry regarding the device and may be identified to one or more personnel that a suspect/not allowed device is within the area.

After modelling the devices within the area, the management system waits for a signal detection at step 120.

Upon detecting a signal transmission from a wireless device, a determination is made whether the wireless device associated with the signal is authorized to operate within the area. For example, the detected signal may provide identification information (e.g., IMEI) that may then be compared with the attribute information associated with the wireless device stored in the model.

For example, if the detected signal is received within the secured or restricted area, a comparison with, for example, an allowed time to transmit may be made. Similarly, a location of the device may be made, based on information from the device (e.g., signal strength, time of arrival, GPS, etc.) to determine whether the device is within the area. If the dynamically determined location of the device is determined as being within the area, then a comparison is made with regard to the location attribute associated with the device. Similarly, the device identification may be compared to registration information associated with the user. Similarly, the device identification may be compared to a history of communication associated with the device.

As would be appreciated, the comparison of the attributes of the device to determine allowability to operate is a multi-tier test. For example, if the call history indicates that operation of the device is consistent with prior communication activity, but there are insufficient funds in an account, an otherwise authorized (allowed) device may be deemed unallowable for purposes of current and future communications.

When the communication associated with the device is indicated as being allowed, the device may be instructed to initiate a handoff from the management system detecting the signal transmission to a carrier system (i.e., a base station covering the secured area, such as Verizon, AT&T, etc.), block 140. The handoff may be initiated by the device by determining a power of a signal transmitted by the detection/management system, being received by the device, being less than a power received by the base station signal.

That is, the detecting/management system may output a signal into the area such that the power of the signal is greater than the power within the area of a corresponding base station associated with the area. The detecting/management system, after determining the wireless device is allowed to communicate, may lower its power output so as to be below that of the corresponding base station associated with the area, for a limited period of time. During this period of time, the device, in detecting a change in power, initiates a hand-off process to acquire a signal having a higher power—in this case the base station associated with the area. The device may then connect to the base station for subsequent communication.

Alternatively, the detecting/management system may provide an indication of allowability to the base station covering the area. The base station may then, after receiving the indication of allowability, direct the device to operate on a channel so that the device may continue to operate on the network associated with the base station.

In one aspect of the invention, and based on allowed communication protocols, the communication of the device with the base station may be monitored and recorded at step 150. Alternately, a determination may be made as to whether recording is allowed to occur. If not, then recording is not performed. For example, communication of persons, such as inmates, not allowed to have free, unencumbered communications may be monitored and/or recorded. However, communications associated with persons, such a security personnel, who are not subject to any restrictions on their communications, are not subject to monitoring or recording. However, even security personnel communication may be subject to monitoring/recording when appropriate legal instruments (e.g., warrants) are appropriated.

Otherwise, recording is continued for the duration of the communication. At block 160, a determination is made whether the communication has been completed. If so, processing completes at block step 170.

Returning to step 130, if the communication is determined not to be authorized or allowed (i.e., unallowed), then processing proceeds to prevent communication of the device with the corresponding base station (step 130).

Such processing may include instructing the device to operate on a channel that is not associated with, or being used by, the base station. Alternatively, a transmitted power of the signal of the detecting/management system may remain at a higher power level such that the device may not determine a handoff is required as the power outputted by the detection/management system, within the area, is greater than the power of a signal associated with the corresponding base station. Alternatively, the detecting/management system may provide an indication of unallowed (or not authorized) to the corresponding base station. The base station may then prevent the device from accessing its network.

In one aspect of the invention, an indication of unallowed may be made based on whether the device has previously been modelled. If not, the communication may be inhibited or prevented, until such time that the detection/management system may perform the modelling process with the device at step 190. The modelling process may have not been performed as the device is a new device within the area. Or the device is outside the area but within the signal coverage area of the area. Similarly, the management/detection system may receive information regarding the device from the base station, as previously discussed.

At step 195, after the device has been appropriately modelled, the device may be triggered (or polled) to re-transmit such that the processing at step 110 may again be initiated.

Figure 2:
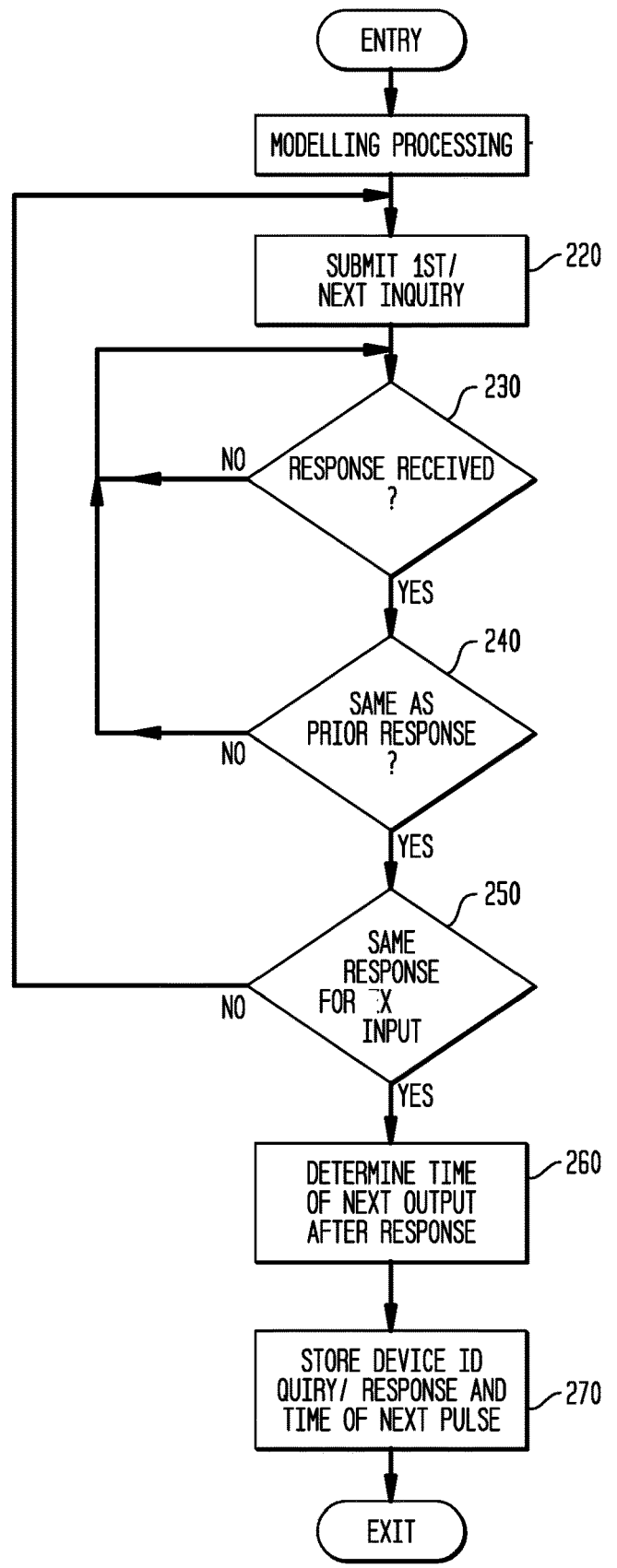
FIG. 2 illustrates an exemplary processing in accordance with the principles of the invention.

FIG. 2 illustrates an exemplary modelling processing in accordance with the principles of the invention.

As previously discussed, information regarding devices within or estimated to be within a restricted/limited/secured access area may be provided to the management/detection system by a base station.

The management/detection system may then cull from the received information, those devices that may potentially be within the secured area.

For each of the cell phones or devices potentially within the restricted/limited/secured area, an inquiry is transmitted at step 220. The cell phone, to which the transmission is directed, may be instructed to provide a response to at least one inquiry. For example, an inquiry may be made to the device for the device to provide one or more of its attributes (e.g., identification number, location, power level, battery status, etc. . . . ).

After a response for the designated device is received (step 230), a determination is made whether the response is similar to one or more prior responses to the same inquiry (step 240.) If not, a next inquiry is transmitted step 220.

However, if the same response is received, then a determination is made whether the same response has been received for a known number of the same inquiry at step 250. If not then a next inquiry is transmitted. However, if the answer is yes, (i.e., a same response to a known number of the same inquiry), then a determination is made with regard to a time of a next signal (or transmission) after the response is received by the detection/management system. That is, a second inquiry, which is determined based on a set of rules associated with the device and the received response is then to be made. The wireless device, may be instructed, as will be discussed, to provide a response transmission to the next inquiry at a known time after the second/next inquiry is transmitted.

Information regarding the identification, the inquiry/response and the time of the next transmission are stored in the model associated with the wireless device. Also stored, as discussed above, is information regarding the allowability (authorization) of the identified device based on at least one characteristic or attribute of the device.

Figure 3:
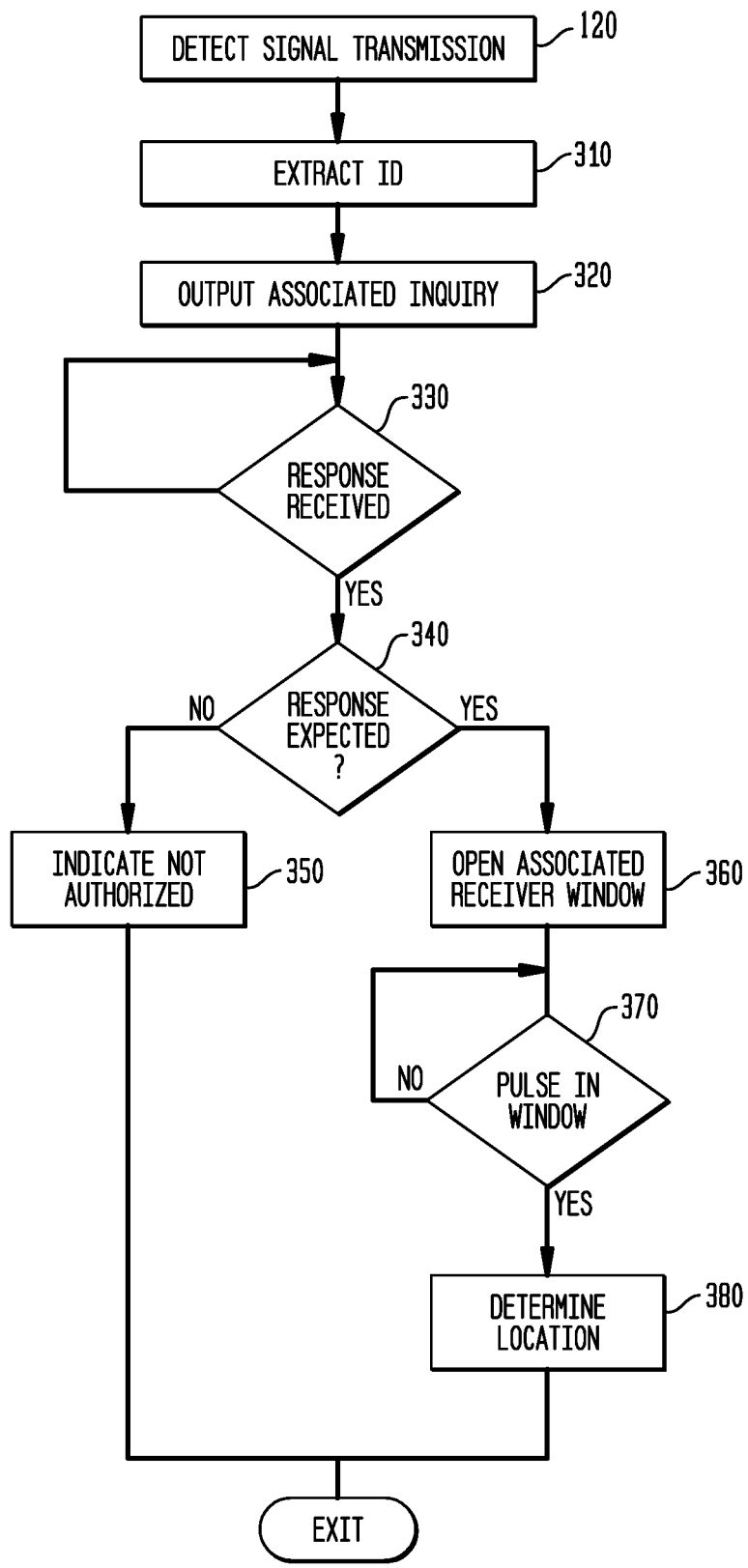
FIG. 3 illustrates an exemplary processing in accordance with the principles of the invention.

FIG. 3 illustrates an exemplary processing in accordance with the principles of the invention.

In this exemplary processing, after a signal is detected (step 120, FIG. 1), the identification information associated with the device is extracted from the device, step 310. Based on the identification information, an inquiry, associated with the identification information, is outputted, step 320, and a response is received, step 330. The inquiry, may for example, require the user to enter a code, for example. Similarly, the inquiry may request the device provide a response with or without user intervention. For example, the inquiry may require the device to provide information regarding the last communication made. That is, the response may contain information regarding a prior communication, which may then be verified by the management/detection system. Similarly, the inquiry may transmit actual or phony information regarding the last communication and the user is required to confirm whether the inquiry information is correct or not.

At step 340 a determination is made whether the response is received and that the response to the inquiry is an expected response. For example, if the inquiry is associated with a last communication, information regarding the last communication (e.g., number called, length of time, etc.) may be transmitted. This information may, for example, be displayed on the device to which the user may confirm as being the last communication information. If the inquiry is associated with biometric information, the determination at block 340 determines whether the response comprises biometric data (e.g., a fingerprint) that is associated with the user.

If the response is not as expected, (e.g., the received biometric information does not match biometric information associated with the device stored in the model), then an indication of not authorized (not allowed) is made at step 350. That is, the wireless device is not in the possession of the person or user associated with the device. Similarly, if the last communication is not entered correctly, or identified correctly, then the device is determined not to be in the possession of the user.

Processing may then continue as shown with regarding to step 130, FIG. 1.

Alternatively, an indication of unallowability may be provided to a base station associated with the area to prevent the base station from allowing further communication with the device.

However, if the response, at step 340, is as expected, then a receive window is opened, (step 360) based on a time associated with the device (determined from the modelling) for which an expected next transmission from the cell phone or device is to occur.

In accordance with the principles of the invention, at least one second inquiry is then provided to the device. The at least one second inquiry may request information from the device similar to or different than that of the first inquiry. The details of the inquiry are determined from the attributes associated with the device stored in the data base.

For example, the second inquiry may require the user to provide information regarding personal information (e.g., birthday and/or names of children, etc.) that is known to the user.

Additionally, the second inquiry may require the user to provide a recent photo of the user, which is then transmitted in the response to the second inquiry. The provide photo may then be used to validate the user when compared to similar information within the model associated with user.

At step 370, a determination is made regarding whether a response to the at least one second inquiry is made during an expected period (i.e., during a receive window).

After a signal is received within the expected window, then a determination of a location of the device based on the signal being received within the time window from at least one wireless detection device (i.e., an antenna/receiving device).

In accordance with the principles of the invention, the location of the device may be determined based on a time and/or an amplitude of a signal transmitted by the device at one or more detection stations (i.e., antenna/receiver combination). Or the location information may be included in the response transmission from the device. For example, the second inquiry may request location information, which the device may provide if the device includes a GPS (Global Positioning Satellite) receiver.

Alternatively, when the device does not include a GPS and a location inquiry is provided, a response that no location information is available, may be a responsive response, as the response to the second inquiry may be consistent with previous responses.

Figure 4:
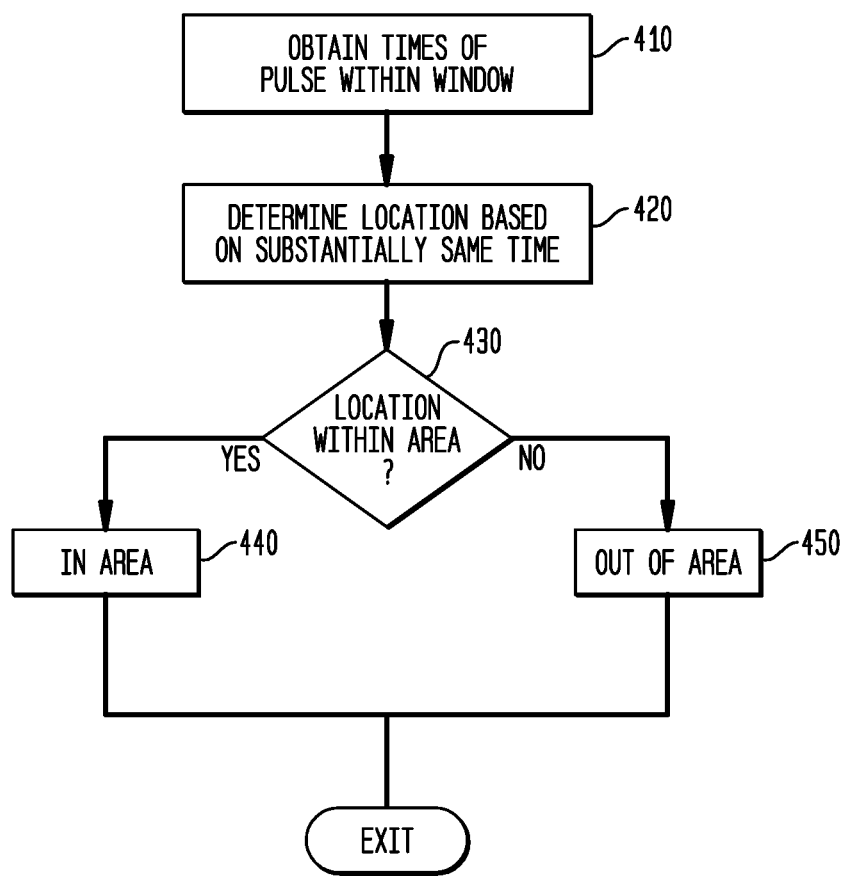
FIG. 4 illustrates an exemplary processing in accordance with the principles of the invention.

FIG. 4 illustrates an exemplary processing for determining a location in accordance with the principles of the invention, wherein a GPS receiver is not available within the device or the location service information is no being used.

At block 410, the times of the signals received within the opened receive window are obtained from at least one detection facility (i.e., antenna/receiver combination). By selecting the signals within the predicted receive window, only signals associated with the device are obtained, while avoiding the use of interfering signals from other devices.

At block 420, a location is determined using known methods. For example, amplitude based triangulation, time of arrival triangulation, time difference of arrival triangulation, etc. may be employed. For example, amplitude based triangulation may be used when the detection devices or facilities have sufficient line of sight to the device that there is little distortion in the measured amplitude caused by walls, for example. Similarly, time difference of arrival triangulation may be utilized when a reference time is provided to each of the detecting sensors (i.e., antenna/ receiver configuration).

At step 430 a determination is made whether the location is within the area. If so, an indication of in-area is provided, step 440. However, if not then an out-of-area is indicated, step 450.

Figure 5:
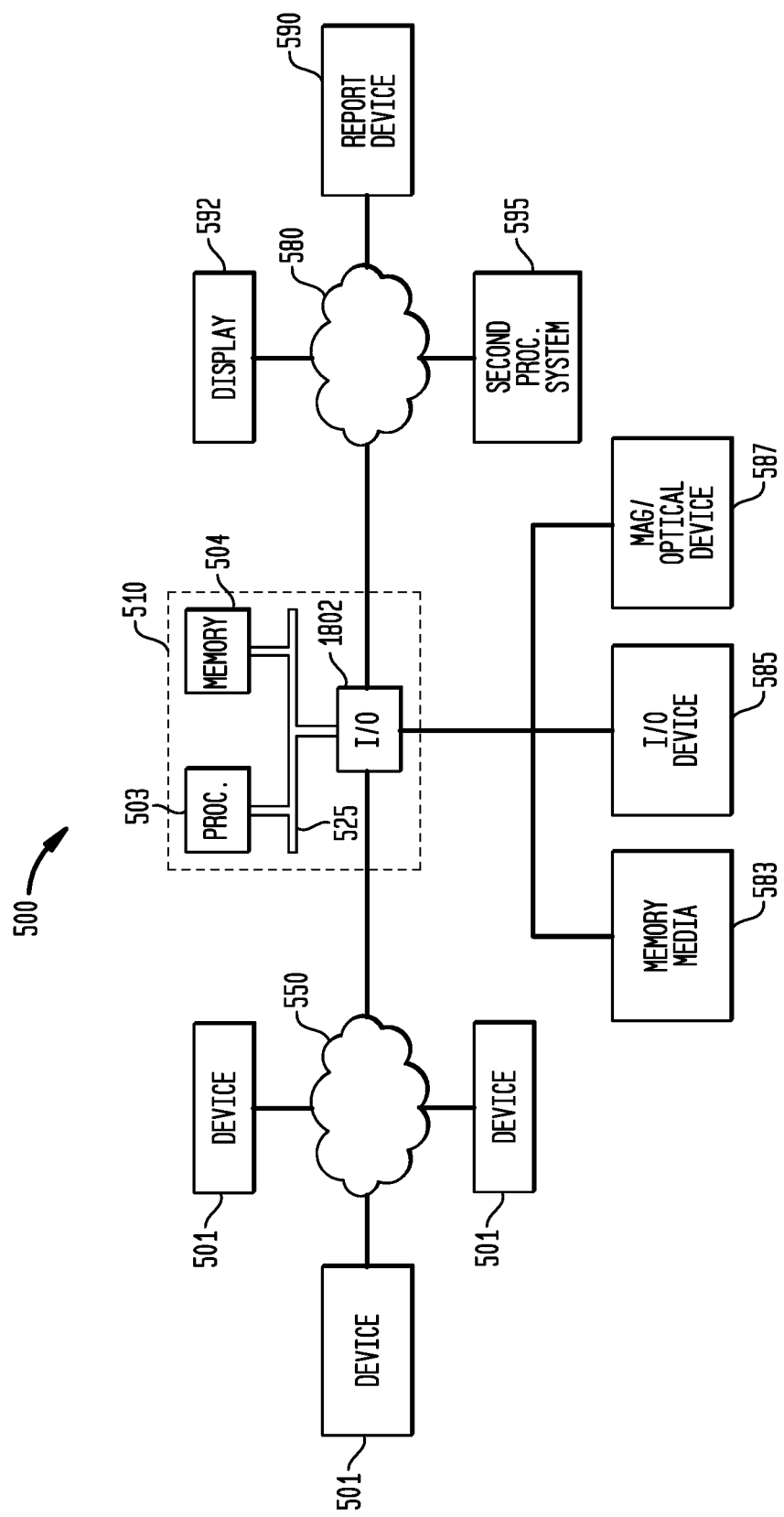
FIG. 5 illustrates an exemplary system configuration to implement the processing shown herein.

FIG. 5 illustrates a system 500 for implementing the principles of the invention shown herein. In this exemplary system embodiment 500, input data is received from sources 501 over network 550 and is processed in accordance with one or more programs, either software or firmware, executed by processing system 510. The results of processing system 510 may then be transmitted over network 580 for viewing on display 592, reporting device 590 and/or a second processing system 595.

Processing system 510 includes one or more input/output devices 502 that receive data from the illustrated sources or devices 501 over network 550. The received data is then applied to processor 503, which is in communication with input/output device 502 and memory 504. Input/output devices 502, processor 503 and memory 504 may communicate over a communication medium 525. Communication medium 525 may represent a communication network, e.g., ISA, PCI, PCMCIA bus, one or more internal connections of a circuit, circuit card or other device, as well as portions and combinations of these and other communication media.

Processing system 510 and/or processor 503 may be representative of a handheld calculator, special purpose or general-purpose processing system, desktop computer, laptop computer, palm computer, or personal digital assistant (PDA) device, etc., as well as portions or combinations of these and other devices that can perform the operations illustrated.

Processor 503 may be a central processing unit (CPU) or a special purpose processing unit or dedicated hardware/software, such as a PAL, ASIC, FGPA, operable to execute computer instruction code or a combination of code and logical operations. In one embodiment, processor 503 may include, or access, code which, when executed by the processor, performs the operations illustrated herein. As would be understood by those skilled in the art when a general-purpose computer (e.g., a CPU) loaded with or accesses code to implement the processing shown herein, the execution of the code transforms the general-purpose computer into a special purpose computer. The code may be contained in memory 504, may be read or downloaded from a memory medium such as a CD-ROM or floppy disk, represented as 583, may be provided by a manual input device 585, such as a keyboard or a keypad entry, or may be read from a magnetic or optical medium (not shown) or via a second I/O device 587 when needed. Information items provided by devices 583, 585, 587 may be accessible to processor 503 through input/output device 502, as shown. Further, the data received by input/output device 502 may be immediately accessible by processor 503 or may be stored in memory 504. Processor 503 may further provide the results of the processing to display 592, recording device 590 or a second processing unit 595.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 510 may also be in two-way communication with each of the sources 501. Processing system 510 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 550 and 580 may also be internal networks or one or more internal connections of a circuit, circuit card or other device, as well as portions and combinations of these and other communication media or an external network, e.g., the Internet and Intranet.

Figure 6:
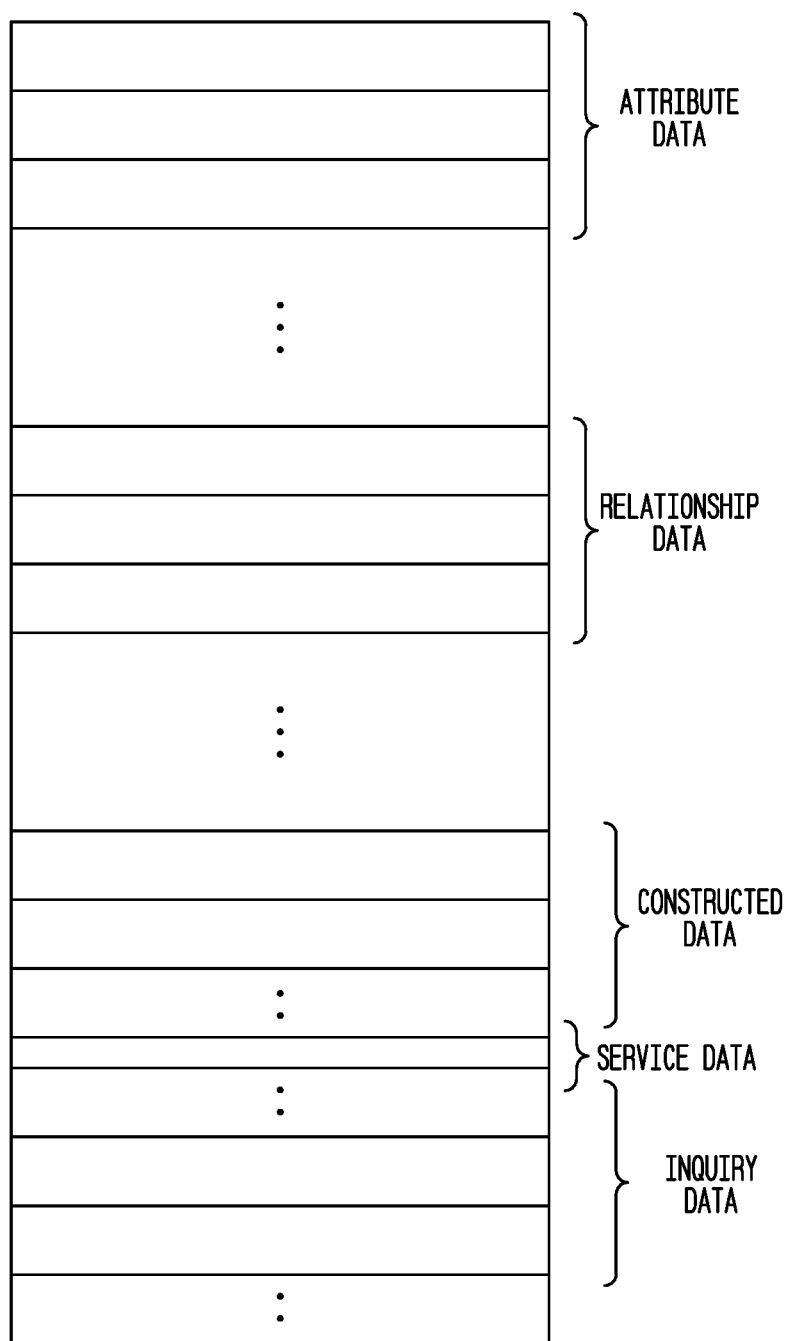
FIG. 6 illustrates an exemplary model configuration associated with wireless devices.

FIG. 6 illustrates an exemplary model associated with each of a plurality of device in accordance with the principles of the invention.

In the exemplary model shown, attribute information associated with the device is stored. The attribute information represents information such as identification number (e.g., IMEI) model number, brand, (Apple, Samsung, etc.).

Further illustrated is relationship information. The relationship information comprises information or attributes regarding, for example, a user, a status of the user (e.g., authorized person, semi-authorized person, restricted person), a user schedule, a user account, a user allowed activity/location, allowed contact information, biometric data (e.g., fingerprint, facial recognition), a time/location of allowed usage, etc.

Further illustrated is dynamically constructed information. The dynamically constructed information, may include, for example, location information, last communication information (e.g., who was called/texted, who called in/texted, etc.), movement information, etc.

Further illustrated is service to be provided information. For example, information regarding scheduling of training courses, instruction courses, etc., may be associated with the device, such that the device may be used to provide training/instruction to a restricted user. Such training/instruction information may be associated with educational materials (e.g., preparation for general education examinations (GED), etc.

Further illustrated is an inquiry data section. The inquiry data section includes information regarding one or more inquires provided to a device in order to authenticate the device and/or the usage of the device.

As discussed, a first inquiry may be made to a device to provide a first step in the authentication process. This first inquiry may include, for example, a location of the device. The provided response may then be compared to prior provided information associated with the device. For example, the device may provide a current location (or a current location may be determined) which is then compared to an expected or a previous location.

When it is determined that the response to the first inquiry matches an expected result, then at least one second inquiry is transmitted to the device. Also, transmitted is an expected time that in which the device is to provide a response. The expected time may be a fixed time or may be determined based, for example, on the status of the expected user.

After a response to the at least one second inquiry is received, the process determines whether the response to the second inquiry matches an expected response. If the response matches, then an indication of allowed is made. Otherwise, an indication of unallowed is made. With an indication of unallowed, further processing may be required to determine whether a minor error in providing data has been entered or whether the user in possession of the device is not the expected person. In this case, a further set of at least one inquiry is provided to the user, based on the inquiry data stored, to determine whether the user/device is authorized to be used.

Figure 7:
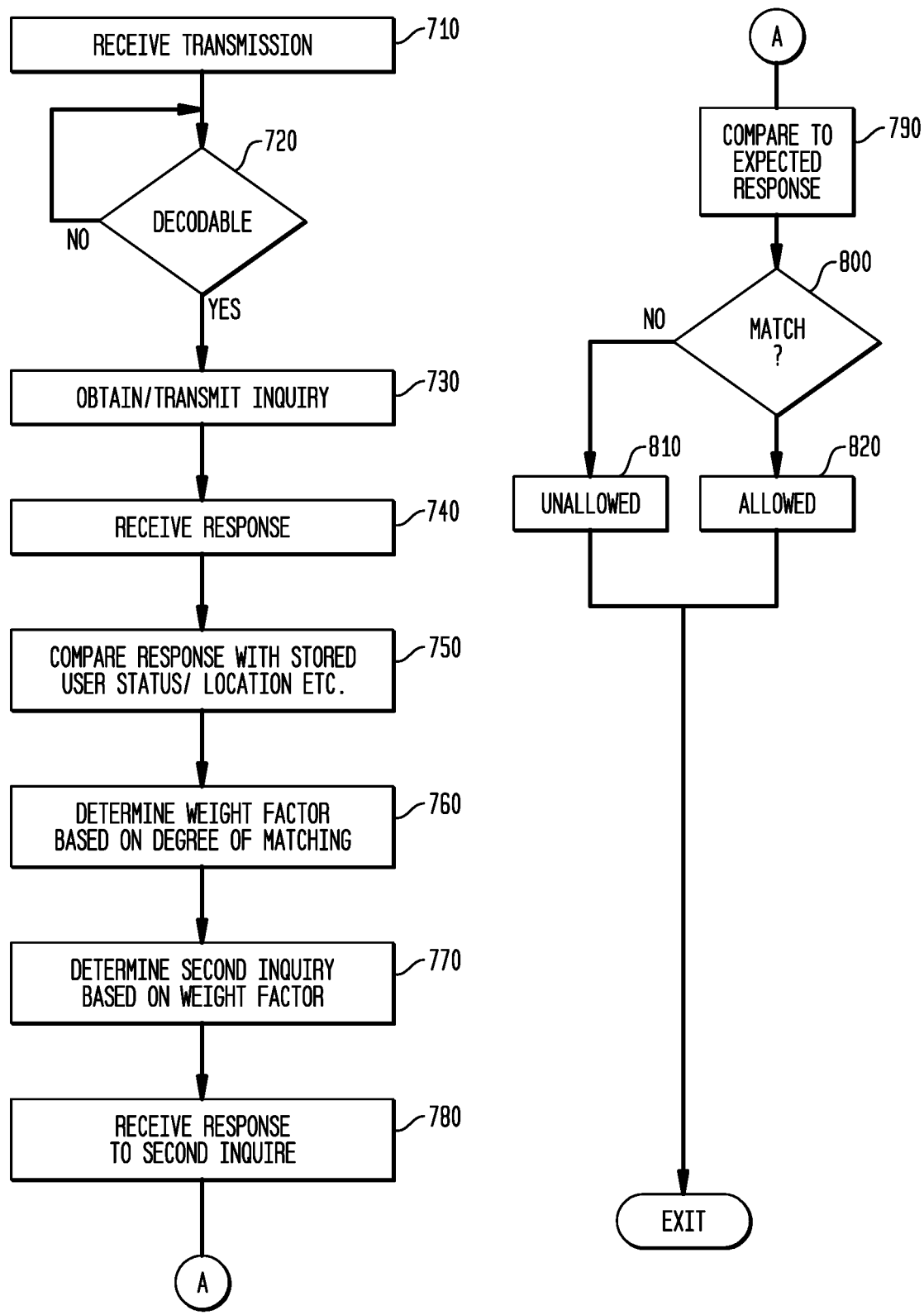
FIG. 7 illustrates an exemplary processing for determining allowability based on the model configuration.

FIG. 7 illustrates an exemplary decision tree regarding providing one or more inquiries to a wireless device.

In this illustrated example, upon detection of a transmission of a wireless transmission device, step 710, information regarding the device is extracted from the received transmission. In one aspect of the invention, the system may use information associated with generalized attribute information regarding communication protocols (e.g., 5G, 4G, . . . ) and type of communication (TDMA, GSM) to determine decoding key to decode the received transmission. Alternatively, the detection/management system may provide instruction to the wireless device to provide information on a communication protocol that allows for the decoding of the information contained in the transmission, step 720.

From the decoded information, an identification of the device may be determined. The identification information allows the system to access a corresponding model from which inquiry information may be obtained and transmitted to the device, step 730, receive a response transmission from the device, step 740, and compare to expected data within the model, step 750.

At step 760 determine a weight factor based on the matching of the response to the first inquiry to one or more attributes. For example, the response may include information regarding a current location, which is then compared to prior location information. A substantial match (e.g., within a few feet) at a corresponding time may be weighted higher than a location that is substantially distance from a prior location at the corresponding time. In addition, the determined location may be matched to an expected location at the corresponding time, such that it may be assumed that the user is in a location that the user should be in at the time (e.g., taking a training course).

Alternatively, or in addition to, the response may be compared to the status of the user and the corresponding time to determine whether a restricted user is allowed to operate at the time.

Alternatively, or in addition to, the response may be compared to an account of a restricted user to determine whether there are sufficient funds for the user to make or accept a transmission (i.e., voice, text, data, internet access, etc.).

Based on the determine weighting of the results from the first inquiry, a second inquiry may be provided to the user (step 770). The second inquiry, as previously discussed, may require the user to provide more specific, user-related, information. For example, the second inquiry may require that the user confirm at least one data point associated with a last usage of the device. Or required to provide a current photograph of the user. The photograph may be one that is self-taken or may be one in which the user is instructed to place the device in a specific position with respect to the user. The device may be instructed to photograph the user and provide the photograph to the management station. Also provided is a time in which the device is required to provide a response to the second inquiry.

As would be recognized, the second inquiry may be tied to the confidence factor (i.e., the weighting) of the response to the first inquiry. Thus, a second inquiry associated with a lower confidence factor (i.e., low weighting) may require a more specific second inquiry response, wherein a second inquiry associated with a high confidence factor may require a more generalized second inquiry response. That is, the specificity of the response to the second inquiry is inversely proportional to the confidence factor.

The device provides the response to the second inquiry (step 780), during the time window (or at least after the time provided to the device), wherein the response is compared to an expected response, step 790.

Although not shown, it would be recognized that in response to a first of the at least one second inquiry, a second of the at least one second inquiry may be provided to the device. The selection of the second of the at least one second inquiry may be based on a measure of a match of the response to the first of the at least one second inquiry, wherein an exact match may cause the second of the at least one second inquiry to have a response that is less restrictive (i.e., allowing for a greater tolerance in the provided answer). On the other hand, a match that is not exact may cause the second of the at least one second inquiry to require a response that is more restrictive (i.e., allowing for a less tolerance in the provided answer).

For example, if a first of the at least one second inquiry requires a bio-metric response (e.g., fingerprint), and the match is not exact, then a second of the at least one second inquiry may be provided to the user which requires a more exact match (e.g., color of hair).

The process of continuing to transmit further second inquiries may continue until a determination is made that the provided responses satisfy the expected results.

At block 800, a determination is made whether the response to the second inquiry occurs within the expected time and matches the expected result. If a match is found, the processing proceeds to step 820 to indicate further communication by the device is allowed.

However, if the match fails, then the device is indicated to be unallowed.

As discussed above, an indication of allowed, may cause the detection/management system to provide an indication of allowed to a base station to allow the wireless device to connect to the base station. Alternatively, an indication of allowed may cause the detection/management system to reduce its power output such that the wireless device initiates a hand-off to connect the wireless device to the base station. That is, the detection/management system includes a transmitter, which outputs a signal similar to a signal transmitted by the base station. The output power of the transmitter being such the received signal strength within the area is greater than a signal strength of the base station within the area.

To enable the hand-off to occur, when allowed is indicated, the processor causes the transmitter to reduce its output power for a predetermined time such that the signal strength of the transmitter output within the area is less than the signal strength of the signal associated with the base station.

Furthermore, an indication of unallowed may cause the wireless device to operate on a channel not available to the base station. Alternatively, the detection/management device may be directed to provide further inquiries to the device occupy the user to continue attempting to connect to the base station. Alternatively, the wireless device may be instructed to activate one or more of its audio/video capabilities and provide audio/video information to the detection/management system. The management system may then provide location and/or the received audio/video information to security personnel to inform them of the detection of an unauthorized device within the secured area.

In summary, a system for managing wireless devices within a restricted area is disclosed, which constructs models, containing attributes/characteristics and at least prior history data information associated with the device, wherein the information is used to determine whether the device is allowed to operate within the area by the device responding to a plurality of inquiries that require the device and/or the user to provide information which is compared to the modeled data.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention. Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. For example, any numerical values presented herein are considered only exemplary and are presented to provide examples of the subject matter claimed as the invention. Hence, the invention, as recited in the appended claims, is not limited by the numerical examples provided herein.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A system for managing wireless devices within an area within a coverage area associated with a base station, the system comprising:
    at least one detection facility comprising:
       a receiving system, said detection facility configured to:
          detect transmission from at least one of said wireless devices within said area;
       a processor configured to:
          receive an indication of the detected transmission;
          extract information from the detected transmission;
          access a data base based on the extracted information to determine a first inquiry, wherein said first inquiry is selected based on previously obtained information associated with said at least one of said wireless devices;
          transmit the first inquiry to said at least one of said wireless devices;
          receive a response to said first inquiry;
          determine a confidence factor based on the received response to the first inquiry, wherein the confidence factor represents a measure of the received response matching at least one element in the data base associated with said at least one of said wireless devices, wherein said at least one element comprises at least one response to a corresponding one of at least one prior transmitted first inquiry;
          determine at least one second inquiry, wherein the at least one second inquiry is determined based on a specificity of an expected response to the determined at least one second inquiry, wherein said specificity is inversely proportional to the confidence factor;
receive at least one response to the at least one second inquiry; and
determine an allowability of the at least one of said wireless devices to operate within the area based on the at least one response corresponding to the at least one second inquiry satisfying said specificity of said at least one second inquiry and being received during an expected time window, wherein said expected time window is based on said at least one of said wireless device.

2. The system of claim 1, wherein the processor is further configured to:
receive information regarding said wireless devices within the coverage area;
construct a data base for each of the wireless devices determined to be within the area, said data base including information received from the base station regarding said wireless devices and information dynamically determined from communications associated with said wireless devices.

3. The system of claim 1, wherein the processor is further configured to:
provide an indication of the determined allowability to the base station.

4. The system of claim 1, wherein the allowability is one of: allowed and unallowed.

5. The system of claim 1, wherein the processor is further configured to:
provide instruction to the at least one of said wireless devices, said instruction causing the at least one of said wireless devices to operate on a channel selected from a group consisting of: not available to base station and unused by the base station.

6. The system of claim 1, further comprising:
a transmitter configured to:
output a signal within the area, wherein the signal strength received in the area is greater than a signal strength of signal associated with the base station.

7. The system of claim 6, wherein the processor is further configured to:
cause the transmitter to reduce its output signal power for a predetermined period of time, when said allowability is indicated as allowed.

8. The system of claim 1, wherein the specificity of the at least one expected response to the at least one second inquiry is less restrictive for subsequent second inquiries.

9. The system of claim 1, wherein the processor is configured to:
transmit a predetermined number of said first inquiry;
determine whether a known number of responses received from corresponding ones of the predetermined number of said first inquiry are substantially same; and
determine the expected time window for receipt of the response to said second inquiry.

10. The system of claim 9, wherein said processor is configured to:
determine whether said response to a corresponding one of said at least one second inquiry is received within said expected time window; and
identify said one of said wireless devices as unauthorized when said response to a corresponding one of said at least one second inquiry is not received within the expected time window.

11. The system of claim 10, wherein said processor is configured to:

determine a location of said one of said wireless devices based on responses to corresponding ones of said at least one second inquiry received during said expected time window from at least one of said at least one detection facility.

12. The system of claim 1, wherein said response to said first inquiry comprises one of: requiring user intervention and not requiring user intervention.

13. The system of claim 1, wherein said processor is configured to:
initiate a second one of said at least one second inquiry when allowability is determined to be unallowed, wherein said second one of said at least one second inquiry comprises at least one further inquiry to evaluate.

14. A system for managing a wireless device within an area within a coverage area associated with a base station, the system comprising:
at least one detection facility comprising:
a receiving system configured to:
detect transmission of said wireless device within said coverage area;
a processor configured to:
receive an indication of the detected transmission;
extract information from the detected transmission;
determine a first inquiry based on the extracted information, wherein said first inquiry is determined from a data base of information regarding information associated with the wireless devices;
transmit the first inquiry to said wireless device;
receive, from said wireless device, a response to the first inquiry;
determine a confidence factor based on the received response to the first inquiry, wherein the confidence factor is based on the received response;
determine whether a second inquiry is necessary, wherein a specificity of the second inquiry is based on information associated of the detected transmission and said received response;
transmit the second inquiry to said wireless device, when necessary;
receive at least one response to the second inquiry; and
determine an allowability of said wireless device to operate within the area based on the response to the second inquiry being received within a time window, which had been provided to the wireless device and information of said wireless device.

15. The system of claim 14, wherein the processor is further configured to:
receive information regarding wireless devices located in at least one of: within said area and outside said area; and
construct at least one database for each of the wireless devices determined to be within the area, and a database for each of the wireless devices determined to be outside the area, said databases including information received at least from the base station.

16. The system of claim 14, wherein the processor is further configured to:
provide an indication of the determined allowability to the base station.

17. The system of claim 14, wherein the allowability is one of: allowed and unallowed.

18. The system of claim 17, wherein the processor is further configured to:
route transmissions from said wireless device to a carrier network when said allowability is indicated as allowed.

19. The system of claim 17, wherein the processor is further configured to:
route transmissions from said wireless device to a hold channel when said allowability is indicated as not allowed.

20. The system of claim 17, wherein said processor is configured to:
initiate another second inquiry when allowability is determined to be unallowed, wherein said another second inquiry comprises at least one further inquiry to evaluate.

21. The system of claim 14, wherein the processor is further configured to:
provide instruction to said wireless device, said instruction causing said wireless device to operate on a channel selected from a group consisting of: not available to said base station, available to said base station, used by said base station and unused by said base station.

22. The system of claim 14, wherein the processor is configured to:
transmit at least one subsequent second inquiry; and
receive a response to each of said at least one subsequent transmitted second inquiry, wherein said response to a current at least one subsequent transmitted second inquiry being less restrictive than a response associated with a previous at least one subsequent transmitted second inquiry.

23. The system of claim 14, wherein the processor is configured to:
transmit a predetermined number of said first inquiry;
determine whether a known number of responses received from corresponding ones of the predetermined number of said first inquiries are substantially a same; and
determine an expected time window for receipt of the response to said second inquiry.

24. The system of claim 23, wherein said processor is configured to:
determine whether said response to said second inquiry is received within said expected time window; and
identify said wireless device as unauthorized when said response to said second inquiry is not received within the expected time window.

25. The system of claim 24, wherein said processor is configured to:
determine a location of said wireless device based on responses received during said expected time window.

26. The system of claim 14, wherein said responses to said first inquiry comprises one of: requiring user intervention and not requiring user intervention.

* * * * *